US009957068B2

(12) United States Patent
Aston et al.

(10) Patent No.: US 9,957,068 B2
(45) Date of Patent: *May 1, 2018

(54) MULTIPLE SPACE VEHICLE LAUNCH SYSTEM

(71) Applicant: The Boeing Company, Chicago, IL (US)

(72) Inventors: Richard W. Aston, Brea, CA (US); Anna M. Tomzynska, Seal Beach, CA (US); Glenn N. Caplin, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/925,152

(22) Filed: Oct. 28, 2015

(65) Prior Publication Data
US 2016/0046397 A1 Feb. 18, 2016

Related U.S. Application Data

(63) Continuation of application No. 14/486,103, filed on Sep. 15, 2014, which is a continuation of application
(Continued)

(51) Int. Cl.
*B64G 1/36* (2006.01)
*B64G 1/64* (2006.01)
(Continued)

(52) U.S. Cl.
CPC ............. *B64G 1/641* (2013.01); *B64G 1/002* (2013.01); *B64G 1/40* (2013.01); *B64G 1/405* (2013.01); *B64G 1/645* (2013.01)

(58) Field of Classification Search
CPC ........ B64G 1/641; B64G 1/002; B64G 1/402; B64G 1/645; B64G 1/401; B64G 1/14;
(Continued)

(56) References Cited

U.S. PATENT DOCUMENTS 3,420,470 A * 1/1969 Meyer .................... B64G 1/641
102/378
4,009,851 A * 3/1977 Cable ....................... B64G 1/10
244/173.1
(Continued)

FOREIGN PATENT DOCUMENTS

CN 1131291 9/1996
EP 1013546 6/2000
(Continued)

OTHER PUBLICATIONS

US, Notice of Allowance, U.S. Appl. No. 14/486,103 (Dec. 9, 2015).
(Continued)

*Primary Examiner* — Medhat Badawi
(74) *Attorney, Agent, or Firm* — Thompson Hine LLP

(57) ABSTRACT

A space vehicle system, a method of manufacturing the space vehicle system, and a method of launching the space vehicle system are disclosed. The method of manufacturing the space vehicle system may include disposing a first space vehicle with an upper core structure upon a second space vehicle with a lower core structure such that loads of the first space vehicle are transmitted to the lower core structure of the second space vehicle.

26 Claims, 3 Drawing Sheets

Related U.S. Application Data

No. 13/604,050, filed on Sep. 5, 2012, now Pat. No. 8,915,472.

(60) Provisional application No. 61/646,222, filed on May 11, 2012.

(51) Int. Cl.
*B64G 1/00* (2006.01)
*B64G 1/40* (2006.01)

(58) Field of Classification Search
CPC ... B64G 1/66; B64G 1/26; B64G 1/22; B64G 2001/643; B64G 1/40; B64G 1/405; B64G 1/242; B64G 1/1085
See application file for complete search history.

(56) References Cited

U.S. PATENT DOCUMENTS

| | | | |
|---|---|---|---|
| 4,896,848 A * | 1/1990 | Ballard | B64G 1/007 244/171.3 |
| 5,199,672 A | 4/1993 | King et al. | |
| 5,350,137 A | 9/1994 | Henley | |
| 5,386,953 A | 2/1995 | Stuart | |
| 5,397,082 A | 3/1995 | Scott | |
| 5,411,226 A | 5/1995 | Jones et al. | |
| 5,522,569 A | 6/1996 | Steffy et al. | |
| 5,529,264 A | 6/1996 | Bedegrew et al. | |
| 5,613,653 A * | 3/1997 | Bombled | B64G 1/641 244/173.1 |
| 5,647,561 A | 7/1997 | Robinson et al. | |
| 5,716,029 A | 2/1998 | Spitzer et al. | |
| 5,743,492 A | 4/1998 | Chan et al. | |
| 5,755,406 A * | 5/1998 | Aston | B64G 1/1007 244/159.4 |
| 5,765,780 A | 6/1998 | Barskey et al. | |
| 5,884,866 A | 3/1999 | Steinmeyer et al. | |
| 5,984,235 A * | 11/1999 | Snowhook | B64G 1/007 244/171.3 |
| 6,138,951 A * | 10/2000 | Budris | B64G 1/002 102/393 |
| 6,193,187 B1 | 2/2001 | Scott et al. | |
| 6,206,327 B1 | 3/2001 | Benedetti et al. | |
| 6,227,493 B1 | 5/2001 | Holemans | |
| 6,237,876 B1 * | 5/2001 | Barker | B64G 1/007 244/158.6 |
| 6,296,206 B1 * | 10/2001 | Chamness | B64G 1/00 244/173.3 |
| 6,343,770 B2 | 2/2002 | Holemans | |
| 6,390,416 B2 | 5/2002 | Holemans | |
| 6,454,214 B1 * | 9/2002 | Smith | B64G 1/641 102/377 |
| 6,543,724 B1 | 4/2003 | Barnett | |
| 7,109,748 B1 * | 9/2006 | Liu | H03K 19/0016 326/113 |
| 7,113,851 B1 | 9/2006 | Gelon et al. | |
| 7,114,683 B2 | 10/2006 | Hall | |
| 7,138,960 B2 | 11/2006 | Carroll et al. | |
| 7,219,858 B2 * | 5/2007 | Sharer | B64G 1/1085 244/158.4 |
| 7,823,837 B2 | 11/2010 | Behrens et al. | |
| 7,861,975 B2 | 1/2011 | Behrens et al. | |
| 7,905,453 B2 | 3/2011 | Benedict et al. | |
| 8,006,938 B2 | 8/2011 | Behrens et al. | |
| 8,016,240 B2 | 9/2011 | Caplin et al. | |
| 8,281,697 B2 | 10/2012 | McCants, Jr. | |
| 8,499,874 B2 | 8/2013 | Dewis et al. | |
| 8,511,617 B2 | 8/2013 | Caplin et al. | |
| 8,789,797 B2 | 7/2014 | Darooka | |
| 9,027,889 B2 | 5/2015 | Aston et al. | |
| 9,108,748 B2 | 8/2015 | Munir et al. | |
| 9,108,749 B2 | 8/2015 | Woo et al. | |
| 2003/0150958 A1 * | 8/2003 | Herbert | B64G 1/10 244/159.4 |
| 2004/0164205 A1 | 8/2004 | Kellberg | |
| 2006/0016934 A1 | 1/2006 | Sharer | |
| 2007/0228219 A1 * | 10/2007 | Behrens | B64G 1/1078 244/172.5 |
| 2007/0228220 A1 * | 10/2007 | Behrens | B64G 1/1078 244/172.5 |
| 2008/0149777 A1 * | 6/2008 | Benedict | B64G 1/641 244/158.1 |
| 2008/0237399 A1 | 10/2008 | Caplin et al. | |
| 2009/0108139 A1 | 4/2009 | Duden | |
| 2009/0224105 A1 * | 9/2009 | Caplin | B64G 1/1085 244/158.4 |
| 2010/0176248 A1 | 7/2010 | Terziakin | |
| 2011/0031352 A1 | 2/2011 | Behrens et al. | |
| 2011/0139936 A1 * | 6/2011 | Allen | B64G 1/1078 244/158.2 |
| 2012/0097796 A1 | 4/2012 | Munir et al. | |
| 2012/0097797 A1 | 4/2012 | Woo et al. | |
| 2012/0210852 A1 | 8/2012 | McCants | |
| 2012/0227374 A1 * | 9/2012 | Zegler | F02K 9/44 60/204 |
| 2013/0099059 A1 * | 4/2013 | | Cheynet De Beaupre B64G 1/10 244/158.1 |
| 2013/0221162 A1 * | 8/2013 | Darooka | B64G 1/10 244/173.1 |
| 2014/0061386 A1 * | 3/2014 | Peterka, III | B64G 1/002 244/171.5 |
| 2014/0239125 A1 | 8/2014 | Aston et al. | |
| 2015/0028159 A1 * | 1/2015 | Vichnin | B64G 1/002 244/172.8 |

FOREIGN PATENT DOCUMENTS

| | | |
|---|---|---|
| JP | 03193597 | 8/1991 |
| RU | 2040448 | 7/1995 |
| RU | 2124461 | 1/1999 |
| RU | 2233772 | 8/2004 |
| RU | 2246035 | 2/2005 |
| RU | 59749 | 12/2006 |
| RU | 2328616 | 7/2008 |
| WO | 2005/118394 A1 | 12/2005 |

OTHER PUBLICATIONS

European Search Report, European Application No. 13167339.4 (Sep. 26, 2013).

Porte, F. et al., "Benefits of Electric Propulsion for Orbit Injection of Communication Spacecraft," International Communication Satellite Systems Conference and Exhibit, pp. 1-9 (Mar. 22, 1992).

Mailhe, L.M. et al., "Design of a Hybrid Chemical/Electric Propulsion Orbital Transfer Vehicle," Journal of Spacecraft and Rockets, vol. 39, No. 1, pp. 131-139 (Jan. 2002).

Clark, S. "Two broadcasting satellites share Proton rocket ride," web page of Spaceflight Now, http://www.spacefightnow.com/proton/ses3/ (Jul. 15, 2011).

US, Non-Final Office Action; U.S. Appl. No. 13/604,050 (Feb. 14, 2014).

US, Notice of Allowance; U.S. Appl. No. 13/604,050 (May 20, 2014).

US, Notice of Allowance; U.S. Appl. No. 14/486,103 (Jan. 23, 2015).

US, Non-Final Office Action; U.S. Appl. No. 14/486,103 (May 13, 2015).

US, Notice of Allowance; U.S. Appl. No. 14/486,103 (Sep. 1, 2015).

Examination Report, European Application No. 13167339.4, dated Sep. 1, 2015.

"Boeing 702 Fleet," Jun. 2005, http://www.apcon.aero/news/boeing702.pdf.

Gibbons, D. et al., "Packaging Multiple Small Satellites on a Single Launch Vehicle," Sep. 1989.

Owano, N., "All-electric propulsion satellite by Boeing now fully operational," Tech Xplore, Sep. 2015, http://techxplore.com/news/2015-09-all-electric-propulsion-satellite-boeing-fully.html.

(56) References Cited

OTHER PUBLICATIONS

EP, Examination Report, European Application No. 13167339.4, Apr. 6, 2016.
Baturin, Y. M. ; "The Worldwide piloted Space: Science. History. Technology"; RT Soft, Moscow, pp. 98, 104 and 105 (2005).
RU, Search Report, Patent Application No. 201300451 (Aug. 6, 2013).
CN, Notification of First Office Action, Patent Application No. 201310170861.X (Jun. 17, 2015).
EP, Communication pursuant to Article 94(3) EPC, issued in corresponding European Patent Application No. 13167339.4, 6 pages (Nov. 16, 2016).
EP, Communication pursuant to Rule 114(2) EPC, Third Party Observation, issued in corresponding European Patent Application No. 13167339.4, 4 pages. (Dec. 22, 2016).
Credland, J.; "The Cluster Mission—ESA's Space Fleet to the Magnetosphere"; The Cluster Mission, ESA Bulletin No. 84; pp. 113-137 (Nov. 1995).
The Cluster II Project Team; "The Cluster-II Mission—Rising from the Ashes"; Cluster-II, ESA Bulletin No. 102; pp. 47-53 (May 2000).
Gianolio, Alberto; "Lisa—Laser Interferometer Space Antenna"; EESA, 8 pages (Feb. 3, 2011).
Duchemin, V., et al.; "Electric Propulsion Thruster Assembly for Small GEO—Status Update"; IEPC-2011-167; Presented at the 32nd International Electric Propulsion Conference; pp. 1-9 (Sep. 11-15, 2011).
Prof. Dr. Fuchs, Manfred; "Small GEO, A Product for the Market"; 5th Capital Market Day; OHB System; pp. 1-19 (Feb. 11, 2009).
EP, Brief Communication, issued in corresponding European Patent Application No. 13167339.4, 1 page (May 12, 2017).
Johann, U.A. et al.; "The European Space Agency's LISA Mission Study: Status and Present Results"; 7th Edoardo Amaldi Conference on Gravitational Waves; Journal of Physics: Conference Series 122; doi:10.1088/1742-6596/122/1/012005; pp. 1-8 (2008).
Merkowitz, S.M. et al.; "Lisa propulsion module separation study"; Institute of Physics Publishing; Class. Quantum Gray. 22, doi:10.1088/0264-9381/22/10/037; S413-S419; pp. 1-7 (2005).
Mecke, G.; "The Cluster Spacecraft: A Unique Production Line"; XP 000582980; 2521 ESA Bulletin, No. 84; pp. 118-129 (Nov. 1995).
CN, First Office Action and Search Report with English translation, issued in corresponding Chinese Patent Application No. 201610239117.4, 19 pages (Jun. 7, 2017).
EP, Refusal Decision issued in corresponding European Patent Application No. 13167339.4, 35 pages (Nov. 14, 2017).

* cited by examiner

MULTIPLE SPACE VEHICLE LAUNCH SYSTEM

RELATED APPLICATIONS

This application claims the benefit of U.S. application Ser. No. 14/486,103, filed on Sep. 15, 2014, which claims the benefit of U.S. application No. Ser. 13/604,050, filed on Sep. 5, 2012, which claims the benefit of U.S. Provisional Application No. 61/646,222, filed on May 11, 2012.

BACKGROUND

The present disclosure is directed to space vehicle launch systems and, more particularly, to space vehicle launch systems for launching multiple payloads.

Typical launch vehicles are very expensive. Further, each kilogram of payload that is to be launched into Earth orbit may require as much as ten kilograms of fuel. Accordingly, it may be desirable to minimize payload mass in order to reduce overall cost and fuel requirements. One mechanism for reducing payload mass may be to eliminate any unnecessary structure from the payload.

As a result of such cost concerns, it may be desirable to launch two or more discrete payloads with a single launch vehicle. Such multiple payloads may be in the form of space vehicles, such as satellites. Typically, such satellites themselves may require and incorporate chemical rocket motors to increase orbital altitude and to make altitude adjustments once the desired orbital altitude is achieved.

Such chemically powered space vehicles are relatively heavy. Due to space constraints within the payload region of the fairing, it is often necessary to orient such space vehicles in a linear or stacked column that may extend along a central longitudinal axis of the launch vehicle. When such a launch vehicle is on a launch pad, and after lift-off, the orientation of such space vehicles is substantially vertical.

As a result, the weight, or gravitational force of the mass, of an upper space vehicle may bear down upon a lower space vehicle in such a vertical configuration. When the launch vehicle lifts off the launch pad, this gravitational force is multiplied as a result of the acceleration of the launch vehicle into Earth orbit. Because of the mass of the space vehicles, especially if equipped with chemical rocket motors, the lower space vehicle may not be able to withstand the gravitational force and launch load of the upper space vehicle. Accordingly, a support structure is required.

One example of such support structure is a dual-launch structure denoted in French as Systeme de Lancement Double Ariane (Sylda), or in English this is known as a Double Ariane Launch System, as employed on the Ariane 4 and Ariane 5 rockets. A Sylda may be made of carbon fiber and be in the form of a hollow structure that encloses the lower space vehicle and engages and supports the upper space vehicle. Gravitational forces and launch loads may be transmitted from the upper space vehicle, to the Sylda, and from the Sylda to the support base of the fairing. Thus, the lower space vehicle does not have to support the mass and launch load of the upper space vehicle.

A disadvantage of such an arrangement may be that the use of a Sylda adds to the overall payload mass, which may increase the fuel requirement and/or reduce the available size of a payload that is to be launched into orbit by a given launch vehicle. Accordingly, there is a need for a multiple space vehicle launch system that minimizes or eliminates the need for such support structure.

SUMMARY

The present disclosure is directed to a multiple space vehicle launch system that may include a first space vehicle, and a second space vehicle releasably attached to the first space vehicle and oriented relative to the first space vehicle such that, when placed within a fairing, a launch load from the first space vehicle is transmitted to and borne by the second space vehicle, thereby eliminating the need for Sylda or other reinforcing or support structure. In an embodiment, the first and second space vehicles each may include one of an electrical propulsion motor and a hybrid chemical and electrical propulsion motor. By utilizing electrical propulsion motors in the space vehicles, the total mass of the space vehicle may be significantly reduced when compared to a space vehicle having a chemical propulsion motor, which may enable support structures such as Sylda to be eliminated.

According to an embodiment, a method of manufacturing a space vehicle system is disclosed. The method comprises disposing a first space vehicle having an upper core structure upon a second space vehicle having a lower core structure such that loads of the first space vehicle may be transmitted to the lower core structure of the second space vehicle.

In another embodiment, a method of assembling a space vehicle system is disclosed. The method comprises disposing a first space vehicle having an upper core structure upon a second space vehicle having a lower core structure such that loads of the first space vehicle may be transmitted to the lower core structure of the second space vehicle. The method further comprises disposing the first space vehicle and the second space vehicle into a payload region of a launch vehicle.

In yet another embodiment, a space vehicle system is disclosed. The space vehicle system may include a first space vehicle having an upper core structure and a second space vehicle having a lower core structure. The first space vehicle is disposed upon the second space vehicle such that loads of the first space vehicle may be transmitted to the lower core structure of the second space vehicle.

In another embodiment, a method of launching a space vehicle system is disclosed. The space vehicle system may include a first space vehicle having an upper core structure disposed upon a second space vehicle having a lower core structure. The method comprises causing loads associated with the first space vehicle to be transmitted to and borne by the lower core structure of the second space vehicle. The method further comprises launching the first space vehicle and the second space vehicle.

In yet another embodiment, a space vehicle system is disclosed. The space vehicle system may include a first space vehicle having an upper core structure and a second space vehicle having a lower core structure. The first space vehicle is disposed upon the second space vehicle prior to deployment of the space vehicle system such that loads of the first space vehicle may be transmitted to the lower core structure of the second space vehicle. The first space vehicle and the second space vehicle may be separated from one another during the deployment of the space vehicle system.

In the embodiments described above and others, the use of traditional inter-launch vehicle fairing, Sylda, and inter-fairing separation systems may be eliminated. This reduces the non-revenue generating payload mass and may reserve more available mass for revenue generating payload. Other

DETAILED DESCRIPTION

Figure 1:
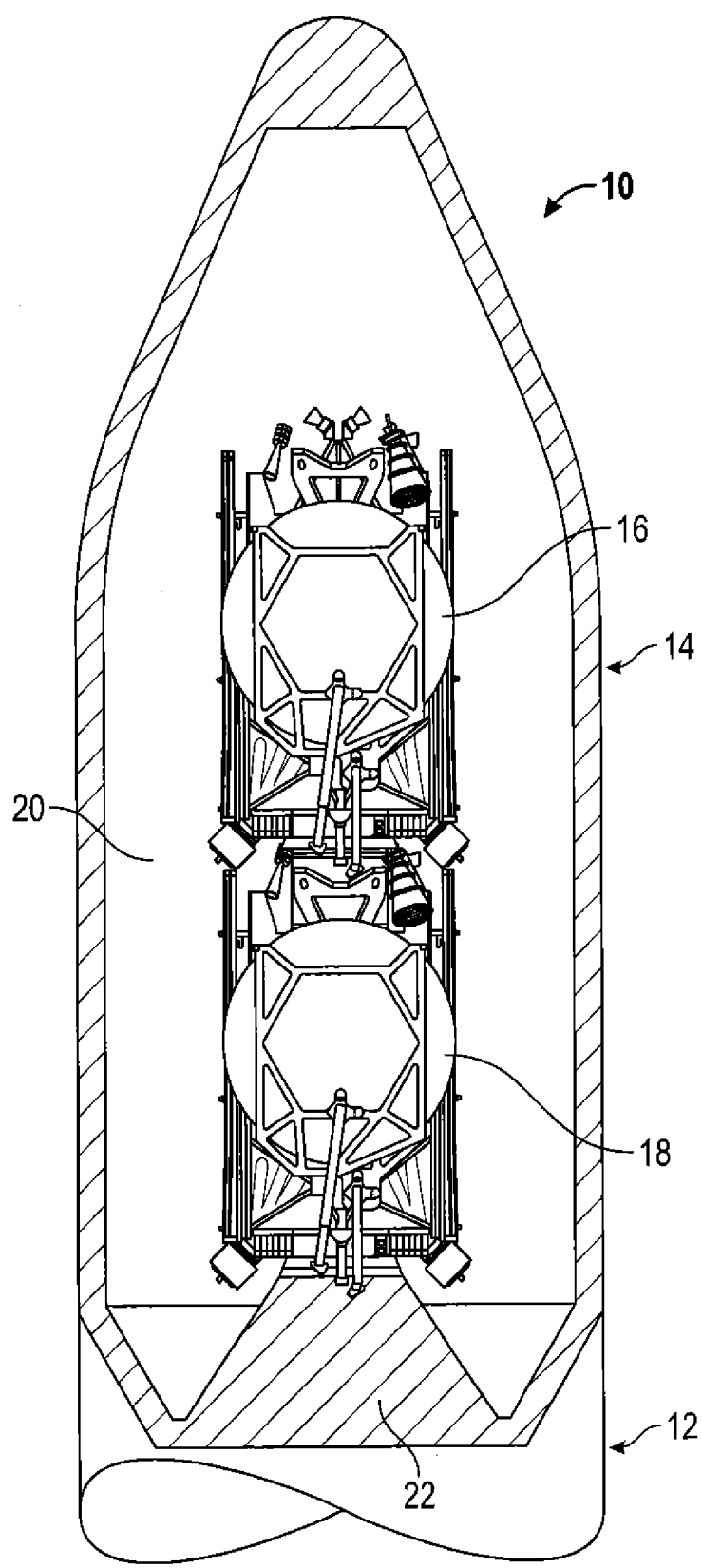
FIG. 1 is a schematic, side elevation in section of an embodiment of the multiple space vehicle launch system of the present disclosure.

As shown in FIG. 1, the multiple space vehicle launch system, generally designated 10, is used with a launch vehicle 12 having a fairing 14. The system 10 may include a first or upper space vehicle, generally designated 16, and a second or lower space vehicle, generally designated 18. The space vehicles are positioned within a payload region 20 of the fairing 14. It should be noted that, although FIG. 1 shows a space vehicle launch system 10 having two space vehicles 16, 18, it is within the scope of the disclosure to provide a space vehicle launch system having three or more space vehicles.

Regardless of the number of space vehicles 16, 18 employed in the launch system, the arrangement of space vehicles within the fairing 14 may be in a stacked, vertical configuration as shown in FIG. 1. The term "vertical" as used herein refers to the orientation of the stacked space vehicles 16, 18 relative to a launch pad (not shown) supporting the launch vehicle 12 when the launch vehicle is oriented in a vertical position, or a vertically stacked manner, relative to the Earth. In an embodiment, the stacked space vehicles 16, 18 may be aligned with, and may coincide with, a central longitudinal axis of the fairing 14 and/or launch vehicle 12. The lower space vehicle 18 may rest upon a base 22 that may be a part of the fairing 14.

Figure 2:
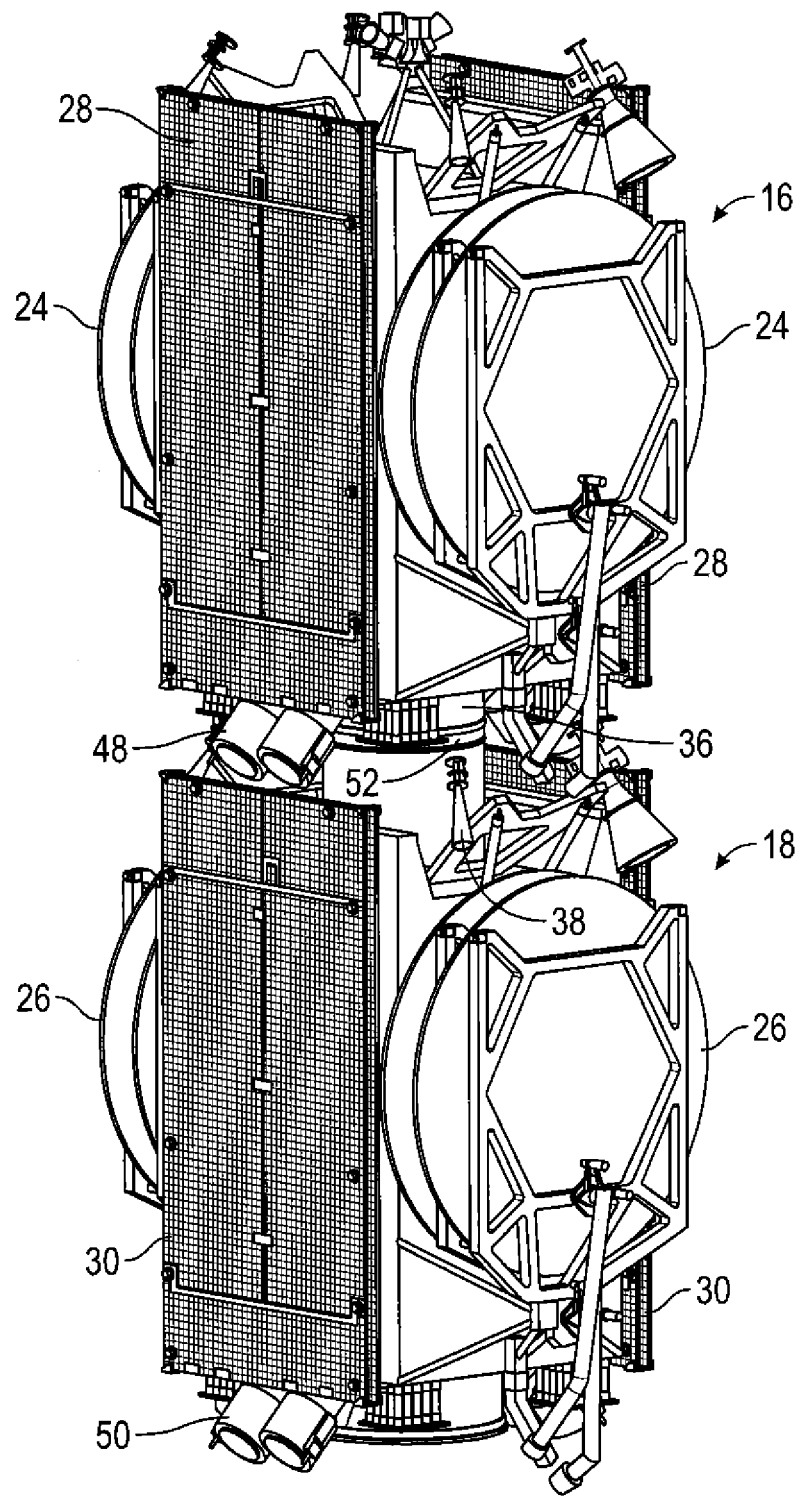
FIG. 2 is a schematic, perspective view of two space vehicles depicted in FIG. 1.
Figure 3:
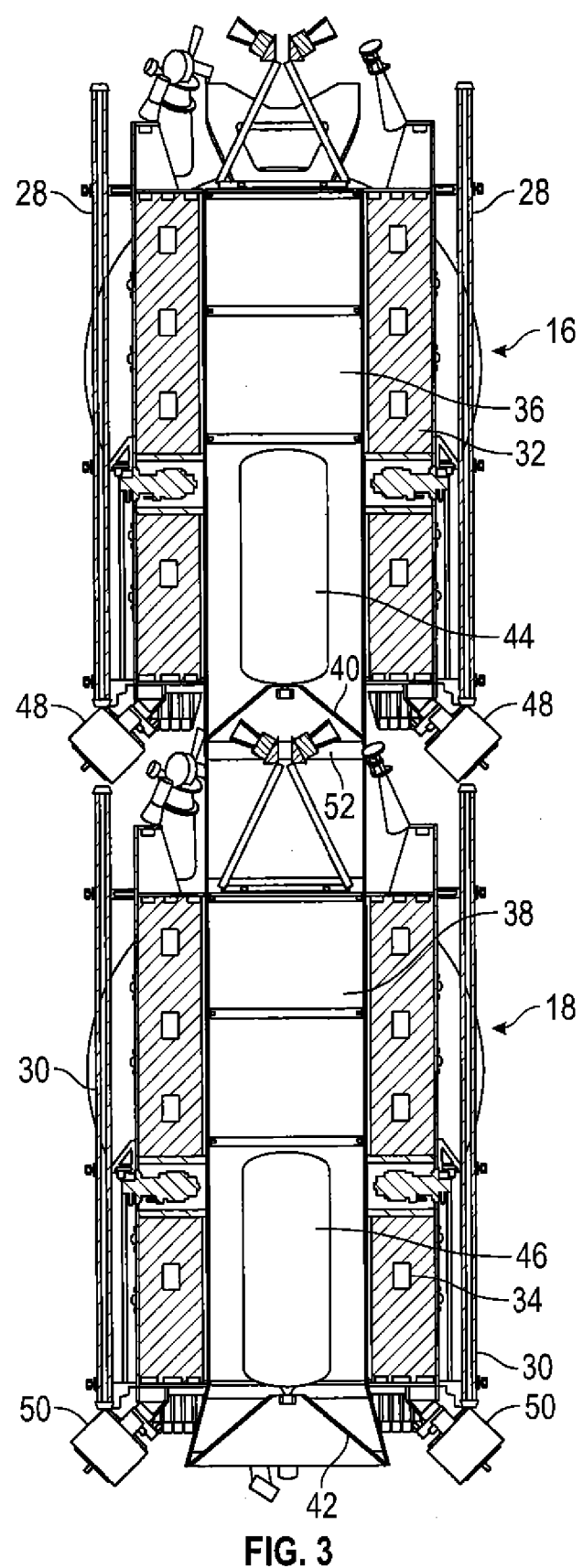
FIG. 3 is a schematic, side elevation in section of the space vehicles depicted in FIG. 1.

As shown in FIGS. 2 and 3, the space vehicles 16, 18 may be satellites. In various embodiments, the space vehicles 16, 18 may be geosynchronous satellites, interplanetary probes, combinations thereof, or any type of space vehicle having a propulsion system that is launched by a launch vehicle 12 (FIG. 1).

The space vehicles 16, 18 may include antenna reflectors 24, 26, respectively, and deployable solar arrays 28, 30, respectively. As best shown in FIG. 3, the space vehicles 16, 18 may include shear load panels 32, 34 that are mounted on core structures 36, 38, respectively.

The core structures 36, 38 may be cylindrical in shape and hollow. Core structures may be of other shapes and not depart from the scope of this disclosure. Core structure 36 may be made of a strong, light material such as graphite, and in one embodiment have a wall thickness of 0.09". Core structure 38 also may be made of a strong, light material such as graphite, and in one embodiment have a wall thickness of 0.45". The shear panels 32, 34 may support the solar arrays 28, 30 of the space vehicles 16, 18, respectively.

In the embodiment shown in FIGS. 2 and 3, the space vehicles 16, 18 each may include an electric propulsion unit such as an electric propulsion motor, generally designated 40, 42, respectively. Electric propulsion motors 40, 42 may consist of an ion/plasma motor that utilizes Xenon gas as a propellant that is stored in tanks 44, 46 that may be positioned within core structures 36, 38, respectively. The electric propulsion motors 40, 42 also may include exhaust nozzles 48, 50, respectively.

In the embodiment shown in FIGS. 2 and 3, the space vehicles 16, 18 each may include a single electric propulsion motor 40, 42 that may constitute the sole source of propulsion and navigation for that space vehicle; no other propulsion source may be included. The components 40, 42 of space vehicles 16, 18 also may represent other types of electric propulsion motors, as well as hybrid electric/chemical propulsion units such as hybrid electric/chemical propulsion motors. It is also within the scope of the disclosure to provide space vehicle 16 with an electric propulsion motor 40 and provide space vehicle 18 with a hybrid electric/chemical propulsion motor 42. Use of electric propulsion motors 40, 42, or hybrid electric/chemical propulsion motors may be advantageous because they reduce the overall mass of the space vehicles 16, 18 in comparison to chemical propulsion motors.

In one embodiment, the upper space vehicle 16 may be connected to the lower space vehicle 18 by a pre-tensioned release band 52 that connects the core structure 36 of the upper vehicle with the core structure 38 of the lower vehicle. As shown in the figures, the core structure 38 of the lower vehicle 18 may extend upwardly above the upper edge of the solar arrays 30 of the lower vehicle to engage the core structure 36 which, in the embodiment shown, may not extend beyond the lower edge of the solar arrays 28 of the upper space vehicle.

In operation, the upper and lower space vehicles 16, 18, respectively, first may be attached to each other by the pre-tensioned release band 52. The combined space vehicles 16, 18 may be placed within the fairing 14 of a launch vehicle 12, as shown in FIG. 1, so that the lower space vehicle rests upon the base 22 of the fairing.

When the launch vehicle is standing on the launch pad (not shown), the launch vehicle 12, fairing 14 and space vehicles 16, 18 may be oriented vertically relative to the Earth. In this configuration, the downward gravitational force of the upper space vehicle 16 may be transmitted to and borne entirely by the lower space vehicle 18. In the embodiment shown, this gravitational force may be transmitted entirely from the core structure 36 of the upper space vehicle 16 to the core structure 38 of the lower space vehicle 18.

During liftoff of the launch vehicle 12, the acceleration forces of the upper space vehicle 16 likewise may be transmitted through the core structure 36 to the core structure 38 of the lower space vehicle 18. In the embodiment shown, the upper and lower space vehicles 16, 18 may be linearly and vertically aligned in a vertically stacked configuration so that the gravitational and launch loads of the upper space vehicle 16 are efficiently transmitted to and borne entirely by the lower space vehicle 18.

In conclusion, two configuration features of the disclosed space vehicle launch system combine to provide a reduction in overall launch system mass. First, the individual space vehicles do not use conventional chemical propellant, but instead use electric propulsion, in one embodiment, which has a higher efficiency and thus requires significantly less propellant mass. In another embodiment, the space vehicles may use a hybrid electric/chemical propulsion motor. Second, the space vehicles may be stacked, one on top of the other, so that the launch loads from the upper space vehicle may pass through the lower space vehicle.

The upper and lower space vehicles may include a compatible mounting structure for releasably mounting adjacent spacecraft. This structure may eliminate the need for an inner fairing structure or a fairing separation system, which otherwise might be necessary for multiple manifested spacecraft. The disclosed vehicle launch system may eliminate a significant amount of mass that is not required to fulfill the primary spacecraft mission, which allows more available mass for revenue-generating payload. Further, minimizing propellant mass and non-functional structure mass from the launch vehicle optimizes the overall system mass.

While the forms of apparatus and methods herein described constitute preferred embodiments of this invention, it is to be understood that the invention is not limited to these precise forms of apparatus and methods, and that changes may be made therein without departing from the scope of the invention.

What is claimed is:

1. A method of manufacturing a space vehicle system, the method comprising:
    disposing a first space vehicle having an upper core structure upon a second space vehicle having a lower core structure such that loads of the first space vehicle are transmitted to the lower core structure of the second space vehicle;
    mounting a first shear load panel on the upper core structure and a second shear load panel on the lower core structure; and
    supporting a first solar array by the first shear load panel and a second solar array by the second shear load panel, wherein the first solar array defines a lower edge and the second solar array defines an upper edge, and wherein the lower core structure of the second space vehicle extends upwardly above the upper edge of the second solar array to engage the upper core structure of the first space vehicle, and the upper core structure does not extend past the lower edge of the first solar array.

2. The method of claim 1, comprising disposing the first space vehicle upon the second space vehicle such that at least a portion of gravitational loads of the first space vehicle are transmitted from the upper core structure to the lower core structure.

3. The method of claim 1, comprising disposing the first space vehicle upon the second space vehicle such that when the first space vehicle and the second space vehicle are disposed in a payload region of a launch vehicle, at least a portion of launch loads of the first space vehicle is borne by the lower core structure of the second space vehicle.

4. The method of claim 1, comprising disposing the first space vehicle upon the second space vehicle such that when the first space vehicle and the second space vehicle are disposed in a payload region of a launch vehicle, at least a portion of acceleration forces of the first space vehicle is transmitted to the lower core structure of the second space vehicle.

5. The method of claim 1, comprising disposing the first space vehicle upon the second space vehicle such that the upper core structure and the lower core structure are releasably attached to one another.

6. The method of claim 1, comprising disposing the first space vehicle upon the second space vehicle such that the upper core structure and the lower core structure are attached to one another with a release band.

7. The method of claim 1, wherein the first space vehicle and the second space vehicle each includes respective propulsion units.

8. The method of claim 7, wherein the respective propulsion units are selected from the group consisting of: an electrical propulsion unit and a hybrid chemical and electrical propulsion unit.

9. A method of assembling a space vehicle system, the method comprising:
    disposing a first space vehicle having an upper core structure upon a second space vehicle having a lower core structure such that loads of the first space vehicle are transmitted to the lower core structure of the second space vehicle;
    disposing the first space vehicle and the second space vehicle into a payload region of a launch vehicle;
    mounting a first shear load panel on the upper core structure and a second shear load panel on the lower core structure; and
    supporting a first solar array by the first shear load panel and a second solar array by the second shear load panel, wherein the first solar array defines a lower edge and the second solar array defines an upper edge, and wherein the lower core structure of the second space vehicle extends upwardly above the upper edge of the second solar array to engage the upper core structure of the first space vehicle, and the upper core structure does not extend past the lower edge of the first solar array.

10. The method of claim 9, comprising launching the first space vehicle and the second space vehicle.

11. The method of claim 10, comprising deploying the first space vehicle and the second space vehicle.

12. The method of claim 11, wherein the upper core structure and the lower core structure are releasably attached to one another during the launching.

13. The method of claim 12, comprising separating the first space vehicle and the second space vehicle from one another during the deployment.

14. The method of claim 12, comprising detaching the upper core structure and the lower core structure from one other during the deployment.

15. The method of claim 14, wherein the first space vehicle and the second space vehicle each includes respective propulsion units.

16. The method of claim 15, wherein the respective propulsion units are operable separately from one another.

17. The method of claim 15, comprising operating the respective propulsion units separately from one another once the first space vehicle and the second space vehicle are deployed.

18. A space vehicle system, comprising:
    a first space vehicle having an upper core structure, a first solar array, and a first shear load panel, wherein the first shear load panel is mounted on the upper core structure, the first shear load panel supports the first solar array, and the first solar array defines a lower edge; and
    a second space vehicle having a lower core structure, a second solar array, and a second shear load panel, wherein the second shear load panel is mounted on the lower core structure, the second shear load panel supports the second solar array, and the second solar array defines an upper edge, and wherein the first space vehicle is disposed upon the second space vehicle such that loads of the first space vehicle are transmitted to the lower core structure of the second space vehicle, and wherein the lower core structure of the second space vehicle extends upwardly above the upper edge of the second solar array to engage the upper core structure of the first space vehicle, and the upper core structure does not extend past the lower edge of the first solar array.

19. The space vehicle system of claim 18, comprising a fairing including a payload region, wherein the first space vehicle and the second space vehicle are positioned within the payload region of the fairing.

20. A method of launching a space vehicle system including a first space vehicle having an upper core structure disposed upon a second space vehicle having a lower core structure, the method comprising:
    mounting a first shear load panel on the upper core structure and a second shear load panel on the lower core structure;
    supporting a first solar array by the first shear load panel and a second solar array by the second shear load panel, wherein the first solar array defines an upper edge and the second solar array defines a lower edge;
    extending the lower core structure upwardly above the upper edge of the second solar array to engage the upper core structure of the first space vehicle, wherein the upper core structure does not extend past the lower edge of the first solar array;
    causing loads associated with the first space vehicle to be transmitted to and borne by the lower core structure of the second space vehicle; and
    launching the first space vehicle and the second space vehicle.

21. The method of claim 20, wherein gravitational loads associated with the first space vehicle are transmitted to and borne entirely by the lower core structure of the second space vehicle.

22. The method of claim 20, wherein launch loads associated with the first space vehicle are transmitted to and borne entirely by the lower core structure of the second space vehicle.

23. The method of claim 20, wherein acceleration forces associated with the first space vehicle are transmitted to and borne entirely by the lower core structure of the second space vehicle.

24. A space vehicle system, comprising:
    a first space vehicle having an upper core structure, a first solar array, and a first shear load panel, wherein the first shear load panel is mounted on the upper core structure, the first shear load panel supports the first solar array, and the first solar array defines a lower edge; and
    a second space vehicle having a lower core structure, a second solar array, and a second shear load panel, wherein the second shear load panel is mounted on the lower core structure, the second shear load panel supports the second solar array, and the second solar array defines an upper edge, and wherein the first space vehicle is disposed upon the second space vehicle prior to deployment of the space vehicle system such that loads of the first space vehicle are transmitted to the lower core structure of the second space vehicle, and the first space vehicle and the second space vehicle are separated from one another during the deployment of the space vehicle system, and wherein the lower core structure of the second space vehicle extends upwardly above the upper edge of the second solar array to engage the upper core structure of the first space vehicle, and the upper core structure does not extend past the lower edge of the first solar array.

25. The space vehicle system of claim 24, wherein the upper core structure and the lower core structure are releasably attached to one another when the first space vehicle is disposed upon the second space vehicle.

26. The space vehicle system of claim 25, wherein the upper core structure and the lower core structure are detached from one another during the deployment of the space vehicle system.

* * * * *